United States Patent
Ndu et al.

(10) Patent No.: US 11,334,501 B2
(45) Date of Patent: May 17, 2022

(54) ACCESS PERMISSIONS FOR MEMORY REGIONS

(71) Applicant: HEWLETT PACKARD ENTERPRISE DEVELOPMENT LP, Houston, TX (US)

(72) Inventors: Geoffrey Ndu, Bristol (GB); Ludovic Emmanuel Paul Noel Jacquin, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 172 days.

(21) Appl. No.: 16/774,638

(22) Filed: Jan. 28, 2020

(65) Prior Publication Data

US 2021/0232510 A1    Jul. 29, 2021

(51) Int. Cl.
| | |
|---|---|
| *G06F 12/14* | (2006.01) |
| *G06F 21/78* | (2013.01) |
| *G06F 9/4401* | (2018.01) |
| *G06F 21/44* | (2013.01) |

(52) U.S. Cl.
CPC ........ *G06F 12/1441* (2013.01); *G06F 9/4401* (2013.01); *G06F 12/1466* (2013.01); *G06F 21/44* (2013.01); *G06F 21/78* (2013.01); *G06F 2212/7207* (2013.01)

(58) Field of Classification Search
CPC .. G06F 12/1441; G06F 12/1466; G06F 21/78; G06F 9/4401; G06F 21/44; G06F 2212/7207
See application file for complete search history.

(56) References Cited

U.S. PATENT DOCUMENTS

| | | | |
|---|---|---|---|
| 5,987,557 A | 11/1999 | Ebrahim et al. | |
| 6,484,227 B1 * | 11/2002 | Mergard | G06F 12/0653 710/26 |
| 8,171,309 B1 * | 5/2012 | Poo | G06F 21/72 713/189 |
| 10,942,870 B1 * | 3/2021 | Liu | G06F 12/1441 |
| 2009/0113141 A1 | 4/2009 | Bullman et al. | |
| 2011/0145531 A1 | 6/2011 | Kobayashi | |
| 2013/0104234 A1 | 4/2013 | Northup | |

(Continued)

FOREIGN PATENT DOCUMENTS

| | | |
|---|---|---|
| CN | 108052461 A | 5/2018 |
| WO | WO-2018091334 | 5/2018 |
| WO | WO-2019114477 A1 | 6/2019 |

OTHER PUBLICATIONS

ARM, AMBA® AXI™ and ACE™ Protocol Specification, AXI3™, AXI4™, and AXI4-Lite™ ACE and ACE-Lite, 2011 (306 pages).

(Continued)

*Primary Examiner* — Michael Krofcheck
(74) *Attorney, Agent, or Firm* — Trop, Pruner & Hu, P.C.

(57) ABSTRACT

In some examples, a control device includes a controller to receive, from a requester device that is separate from the control device, a request to access a first memory region of a memory. The controller is to determine, based on occurrence of a systems initialization event and according to permissions information that identifies access permissions for respective memory regions of the memory, whether access of content in the first memory region is allowed.

20 Claims, 4 Drawing Sheets

(56) References Cited

U.S. PATENT DOCUMENTS

2018/0173294 A1* 6/2018 Kotary .................. G06F 9/4418
2018/0267726 A1   9/2018 Sun et al.

OTHER PUBLICATIONS

ARM, ARM® v7-M Architecture Reference Manual, 2010 (716 pages).
Emmett Witchel et al., "Mondrian Memory Protection," Oct. 2002, pp. 1-13, ACM.
The RISC-V Instruction Set Manual, vol. I: User-Level ISA, Document Version 2.2, May 7, 2017 (145 pages).
The RISC-V Instruction Set Manual, vol. II: Privileged Architecture, Privileged Architecture Version 1.10, Document Version 1.10, May 7, 2017 (91 pages).
Yitbarek et al., Neverland: Lightweight Hardware Extensions for Enforcing Operating System Integrity, May 15, 2019 (15 pages).

* cited by examiner

ACCESS PERMISSIONS FOR MEMORY REGIONS

BACKGROUND

A computer system includes an operating system (OS) kernel, which is the part of the OS that controls various aspects of the computer system. The OS kernel (or more simply "kernel") controls interactions between hardware components and machine-readable instructions, such as an application program or other program code. The kernel is one of the first programs loaded on startup, after system firmware has loaded to perform initialization of the computer system.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain information relating to the kernel can be stored in a separate area of a memory, in which the separate area is protected from access by other entities, such as other programs or users. The information stored in the separate area of the memory can include program code (including machine-readable instructions) of the kernel and data used by the kernel.

The kernel itself can become compromised when modified by malware or another attacker. For example, a rootkit can be used to allow a user or another entity to gain access to a sensitive part of a computer system, such as the kernel. A rootkit includes a collection of programs that allow for unauthorized access in a computer system that is not easily detected. The kernel can also become corrupted by kernel-mode malware.

Other programs in a computer system may rely on the kernel to protect program code and data. Additionally, a security mechanism such as an anti-malware program relies on the proper functioning of the kernel to provide protection against malware attacks. Once the kernel is compromised, other protective mechanisms that are based on a properly functioning kernel may become compromised.

In accordance with some implementations of the present disclosure, a protective mechanism is provided to protect information related to a kernel or any other program or entity that is stored in memory regions of a memory. The protective mechanism determines whether a request to access a memory region that contains protected information is allowed based on occurrence of a system initialization event (e.g., completion of kernel initialization, completion of loading of a portion of the kernel into the memory, completion of a boot phase by firmware, etc.) and according to permissions information that identifies access permissions for respective memory regions of the memory.

Figure 1:
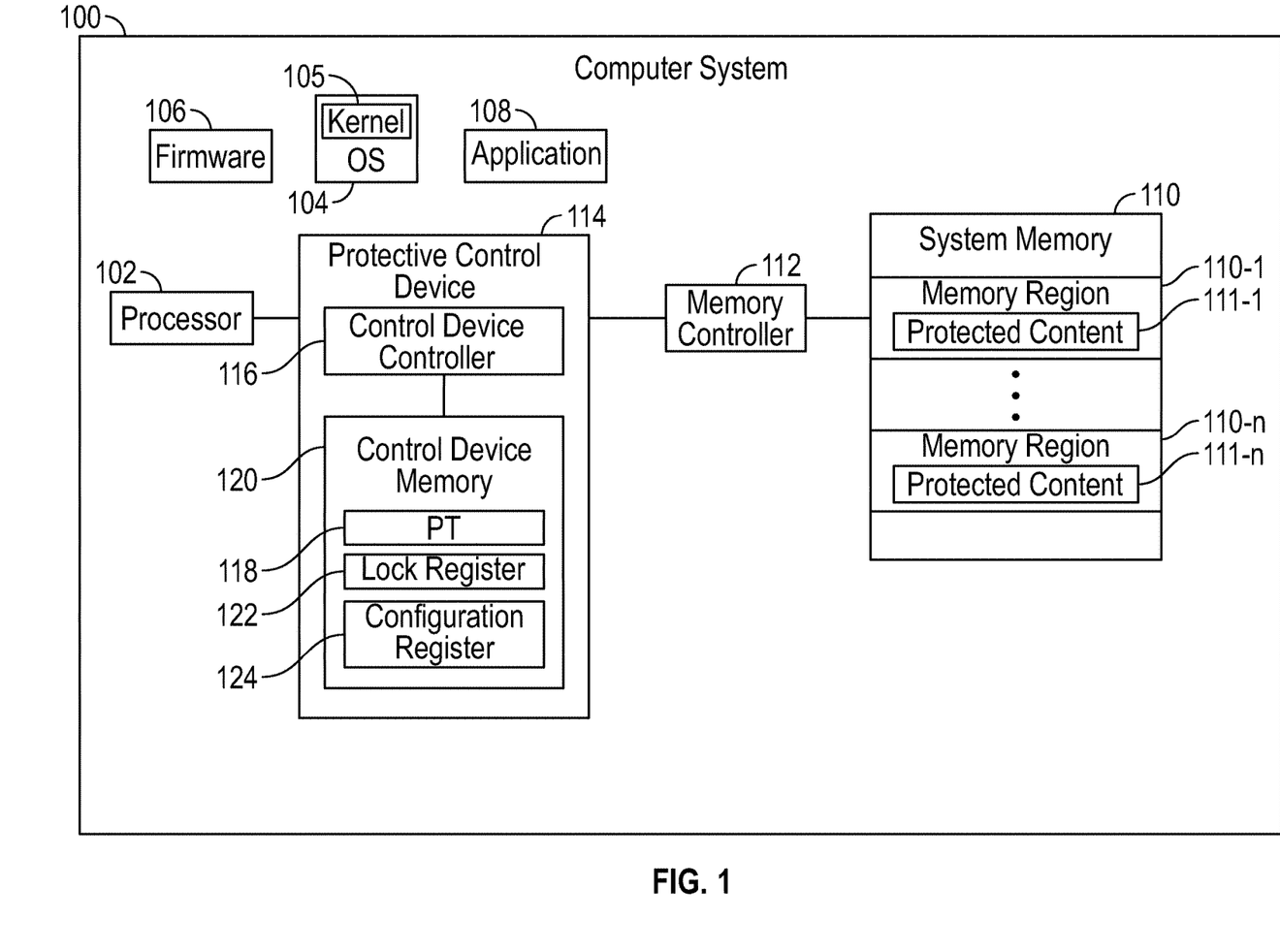
FIG. 1 is a block diagram of a computer system according to some examples.

FIG. 1 is a block diagram of a computer system 100 according to some implementations of the present disclosure. Examples of computer systems include a desktop computer, a notebook computer, a tablet computer, a smartphone, a server computer, a communication node, a storage system, an Internet-of-Things (IoT) device, a game appliance, a vehicle or vehicle controller, and so forth.

The computer system 100 includes a processor 102 that can execute various programs (machine-readable instructions) in the computer system 100. Examples of such programs that can be executed by the processor 102 include a firmware 106 (such as boot code to boot the computer system 100), an operating system (OS) 104, an application 108, or another program. The OS 104 includes a kernel 105 as well as other program code. Each program (104, 106, or 108) can be stored in a storage medium and loaded for execution by the processor 102.

A processor can include a microprocessor, a core of a multi-core microprocessor, a microcontroller, a programmable integrated circuit, a programmable gate array, a digital signal processor, or another hardware processing circuit.

In some examples, the processor 102 is the main processor of the computer system 100 for executing system programs such as the OS 104, the firmware 106, and the application 108.

In other examples, the processor 102 can be a different type of processor, such as a management processor that can perform various management tasks of the computer system 100. An example of such a management processor is a baseboard management controller (BMC), which can perform dedicated management tasks for the computer system 100 independent of the main processor of the computer system 100. The BMC can continue to operate even if the computer system 100 is powered off. Power can continue to be provided to the BMC when the computer system 100 is powered off.

The computer system 100 further includes system memory 110 to store data. The system memory 110 can be implemented using a memory device or multiple memory devices. Examples of memory devices can include any or some combination of the following: a dynamic random access memory (DRAM) device, a static random access memory (SRAM) device, a flash memory device, or any other type of memory device.

The system memory 110 is associated with a memory controller 112 that manages access (write or read) of data in the system memory 110, in response to requests received by the memory controller 112 from a requester device, such as the processor 102 or a different entity (e.g., an input/output (I/O) device, etc.). In examples where functionality of the memory controller is split between a processor side and a memory side, the memory controller 112 can be referred to as a media controller, which is the controller that is able to issue commands to the system memory 110, where the commands conform to the specifications (e.g., timing specifications, signal specifications, etc.) of the system memory 110. In such a split-architecture memory controller, a processor-side memory controller in the processor 102 issues requests to the media controller 112, which converts the requests from the processor-side memory controller to commands that are issued to the system memory 110.

In other examples, a split-architecture memory controller is not used.

As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In accordance with some implementations of the present disclosure, a protective control device 114 is provided between the processor 102 (or any other requester device capable of requesting memory access) and the system memory 110. In some examples, the protective control device 114 can be implemented as part of the memory controller 112. In other examples, the protective control device 114 can be separate from the memory controller 112, and can be implemented using a processing circuit or a combination of a hardware processing circuit and machine-readable instructions separate from the memory controller 112.

The protective control device 114 is separate from the processor 102.

The system memory 110 includes memory regions 110-1 to 110-$n$ (where n 1) that can be used to store respective information associated with the kernel 105. The memory regions 110-1 to 110-$n$ can further store other information, including information related to an application, a user, or any other entity.

The protective control device 114 is able to protect information stored in the memory regions 110-1 to 110-$n$. The information protected by the protective control device 114 is referred to as protected content 111-1 to 111-$n$ stored in the respective memory regions 110-1 to 110-$n$.

In some examples, the protected content that is protected includes static information that is not changed during operation of the computer system 100 after the computer system 100 has booted. Note that the static information may be set during the booting of the computer system 100, and in some cases the static information may be set to different information for different boots of the computer system 100.

Alternatively, the protected content that is protected by the protective control device 114 includes information that can be modified infrequently during operation of the computer system 100.

The protective control device 114 includes a control device controller 116 that is able to receive a request to access the system memory 110 from the processor 102 (or from another requester device). The control device controller 116 can determine whether or not access of protected content in the system memory 110 is permitted based on specified criteria.

The specified criteria may include a criterion relating to a permissions table 118, and a criterion relating to occurrence of a system initialization event. The permissions table 118 can be stored in a control device memory 120 that is part of the protective control device 114, or that can be separate from the protective control device 114.

The permissions table 118 includes permissions information that identifies access permissions for respective memory regions 110-1 to 110-$n$ of the system memory 110. More generally, the permissions table 118 can be in the form of any data structure that can store permissions information. In other words, the data structure does not have to be in table form.

The access permissions identified by the permissions information can be selected from among: a read access mode (to indicate whether or not reading of information in a memory region 110-$i$, i=1 to n, is allowed), a write access mode (to indicate whether or not writing of information to a memory region 110-$i$ is allowed), a privileged access mode (which specifies whether or not information in a memory region 110-$i$ is to be accessed by a requester that has a privileged level), and an instruction access mode (which specifies whether or not information in a memory region 110-$i$ includes machine-readable instructions that are to be fetched for execution).

Although various examples of access permissions are listed above, it is noted that in other examples, additional or alternative access permissions can be specified by the permissions information in the permissions table 118.

If the access permissions specify a privileged access mode for a given memory region 110-$i$, then the requester (e.g., a program executed on the processor 102, an I/O device or a program executed by the I/O device, or any other requesting entity) that is requesting access of the given memory region 110-$i$ is permitted to access the information in the given memory region 110-$i$ if the requester has a privileged level (e.g., a supervisor level, an administrator level, a high privileged level of the OS 104, etc.). For example, if the requester has a user level (which is a non-privileged level), then the requester would not be permitted to access the given memory region 110-$i$.

On the other hand, if the access permissions specify an un-privileged access mode for the given memory region 110-$i$, then access of information in the given memory region given memory region 110-$i$ is permitted for any requester, including a requester that has a privileged level or a requester that has a user level (which is an example of a non-privileged level).

In some examples, the permissions table 118 can specify access permissions for respective physical address regions. An example of the permissions information that can be included in the permissions table 118 is set forth in Table 1 below:

TABLE 1

| Start Address | End Address | R | W | P | X | |
|---|---|---|---|---|---|---|
| A1 | A2 | 1 | 0 | 1 | 0 | Kernel Configuration |
| A3 | A4 | 0 | 0 | 1 | 1 | Driver Code |
| A5 | A6 | 1 | 0 | 1 | 0 | Syscall Table |
| A7 | A8 | 1 | 0 | 1 | 0 | Kernel RO Data |
| A9 | A10 | 0 | 0 | 1 | 1 | Kernel Code |
| A11 | A12 | 1 | 1 | 1 | 0 | Kernel Data |
| A13 | A14 | 0 | 0 | 0 | 0 | Firmware |

In Table 1, the first column specifies the start address of a respective physical address region, and the second column specifies the end address of the respective physical address region. For example, the first row of Table 1 specifies that the start address of a first physical address region (one of the memory regions 110-1 to 110-*n* of FIG. 1) is A1, and that the end address of the first physical address region is A2.

Each combination of a start address and an end address identifies a corresponding memory region 110-*i*.

The "R" column of Table 1 specifies the read access mode (e.g., a value of "1" indicates that read is allowed of the respective memory region, while a value of "0" indicates that read of the respective memory region is not allowed). The "W" column specifies the write access mode (e.g., a value of "1" indicates that write of the respective memory region is allowed, while a value of "0" indicates that write of the respective memory region is not allowed).

The "P" column specifies the privileged access mode (e.g., a value of "1" indicates that access of the respective memory region is allowed only if the requester has a privileged level, and a value of "0" indicates that the requester does not have to have the privileged level to access the respective memory region).

The "X" column specifies execution access mode (e.g., a value of "1" indicates that the respective memory region contains instructions that are to be fetched for execution, and a value of "0" indicates that the information in the memory region does not contain instructions for execution).

In the example of Table 1, the physical address region (A1, A2) contains kernel configuration information (that defines a configuration of the kernel 105), the physical address region (A3, A4) contains driver code (that includes the program code of a driver or multiple drivers that control access of respective hardware components in the computer system 100), the physical address region (A5, A6) contains a Syscall table (that includes information relating to system calls related to the kernel 105), the physical address region (A7, A8) contains kernel read-only (RO) data, the physical address region (A9, A10) contains kernel code, the physical address region (A11, A12) contains kernel data (which can be read and written), and the physical address region (A13, A14) contains firmware.

Although specific examples of information contained in respective physical address regions are provided in Table 1, in other examples, physical address regions can contain other types of information, whether related to the kernel 105 or another entity.

In Table 1, the access permissions indicate that the driver code and kernel code can be fetched from the respective memory regions for execution if the requester has the privileged level. However, the access permissions for the driver code and the kernel code indicate that read access and write access are not permitted for the driver code and the kernel code.

In Table 1, the access permissions indicate that the kernel configuration, the Syscall table, and the kernel RO data can be read if the requester has a privileged level, but that write access is not permitted and execution access is not permitted.

In Table 1, the access permissions indicate that the kernel data in the physical address region (A11, A12) can be read or written if the requester has a privileged level.

In Table 1, the access permissions indicate that, for the firmware, read access is not permitted, write access is not permitted, and execution access is not permitted.

In examples according to FIG. 1, the control device memory 120 further stores a lock register 122 and a configuration register 124. The lock register 122 can store a lock indicator (including a bit or a number of bits) that can be set to respective values to indicate whether or not a portion (or respective portions) of the permissions table 118 can be modified. If the lock indicator is set to a lock value, then that indicates that the portion(s) of the permissions table 118 is (are) not allowed to be modified. However, if the lock indicator is set to an unlock value (different from the lock value), then that indicates that the portion(s) of the permissions table 118 can be modified.

The lock register 122 provides a mechanism (separate from the kernel 105) to prevent the permissions table 118 from being modified. For example, even if the kernel 105 becomes compromised, the control device controller 116 and the lock register 122 that contains the lock indicator set to the lock value would prevent modification of the permissions table 118 to protect the integrity of the protected content 111-1 to 111-*n*.

The entries of the permissions table 118 can be set by the kernel 105 after information related to the kernel 105 (or any other entity) has been written to the memory regions 110-1 to 110-*n* of the system memory 110. The kernel 105 can be trusted during a kernel initialization phase of a boot operation that is protected by a root of trust (e.g., a secure boot operation, a measured boot operation, etc.).

The kernel 105 can lock the permissions table 118 immediately after the kernel 105 has populated the permissions table 118. The kernel 105 locks the permissions table 118 by setting the lock indicator in the lock register 122 to the lock value. In this context, the kernel 105 locking the permissions table 118 "immediately after" populating the permissions table 118 refers to the kernel 105 locking the permissions table 118 subsequently to the populating of the permissions table 118, without an intervening operation that can be insecure.

The protective control device 114 can rely on system events, such as a power-on event (an event corresponding to power being activated for the computer system 100) or a power-off event (an event corresponding to power being deactivated for the computer system 100). In response to a power-on event, the protective control device 114 can determine that a new boot cycle has been triggered, and the permissions table 118 is unlocked based on resetting the lock indicator in the lock register 122.

In further examples, a portion of the permissions table 118 (or an entirety of the permissions table 118) can be reset in response to a power-off event or a power-on event. In additional examples, a portion of the permissions table 118 (or an entirety of the permissions table 118) can be made to be persistent across power cycles (such as in examples where the permissions table (portion) is stored in a non-volatile memory. Content in the persistent permission table (portion) can be modified using a credential-based access (discussed further below).

The configuration register 124 can define an operating mode of the protective control device 114. The configuration register 124 can be set to different values for respective different operating modes. In some examples, the firmware 106 can set the configuration register 124 to a given value during a boot operation. The configuration register 124 being set to a first value indicates that once the permissions table 118 is initially written (such as by the firmware 106 and/or the kernel 105 during a boot operation), a further write of the permissions table 118 is not permitted (by setting the lock indicator to the first value). In other words, the permissions table 118 can be written just once in each boot cycle. During a subsequent reboot of the computer system 100, the content of the permissions table 118 can be set (possibly to different values) by the firmware 106 and/or the kernel 105, since the firmware 106 and/or the kernel 105 during initial phases of the boot operation can be trusted (e.g., not compromised by malware or another attack).

The operating mode where writes of the permissions table 118 are not permitted following the boot operation is provided in cases where the protected content 111-1 to 111-n is static and does not change following initialization in the boot operation.

The configuration register 124 can be set to a different second value to indicate that credential-based modification of the permissions table 118 is permitted even after the permissions table 118 has been initially written during a boot operation. In the credential-based access mode, the permissions table can be unlocked to permit modification of information in the memory regions 110-1 to 110-n. In the credential-based access mode, after the kernel 105 has set the contents of the permissions table 118 during the boot operation, the kernel 105 sets the lock indicator in the lock register 122 to the lock value to prevent further modification of the permissions table 118. However, if the firmware 106 or another entity is presented with a specified credential, then the firmware 106 or other entity can change the lock indicator to the unlock value to permit the kernel 105 (or another entity) to update the permissions table 118 to permit a modification of information in any of the memory regions 110-1 to 110-n.

The specified credential for unlocking the permissions table 118 can be in the form of a password, such as a 256-bit randomly generated value (or any other type of value). As another example, the specified credential can include a signed token. As an example, the firmware 106 can set up the credential before handing over control to the kernel 105 during a boot operation. The kernel 105 or another entity can then present the credential to the firmware 106 to unlock the permissions table 118 if the firmware verifies the presented credential. Modification of the permissions table 118 may be performed in various scenarios, such as in examples where the kernel 105 includes self-modifying code, in examples to perform live patching (live update) of the kernel 105, and so forth.

For the credential-based access mode, the kernel 105 can go through a trusted intermediary, e.g., the firmware 106, to make changes to locked memory regions (such as 110-1 to 110-n). The trusted intermediary can verify that any new information to be written to the locked memory regions 110-1 to 110-n are valid (e.g., not compromised by malware or corrupted), and the trusted intermediary can take action to allow unlocking of the locked memory regions 110-1 to 110-n by presenting the credential to the kernel 105 or to the protective control device 114.

Figure 2:
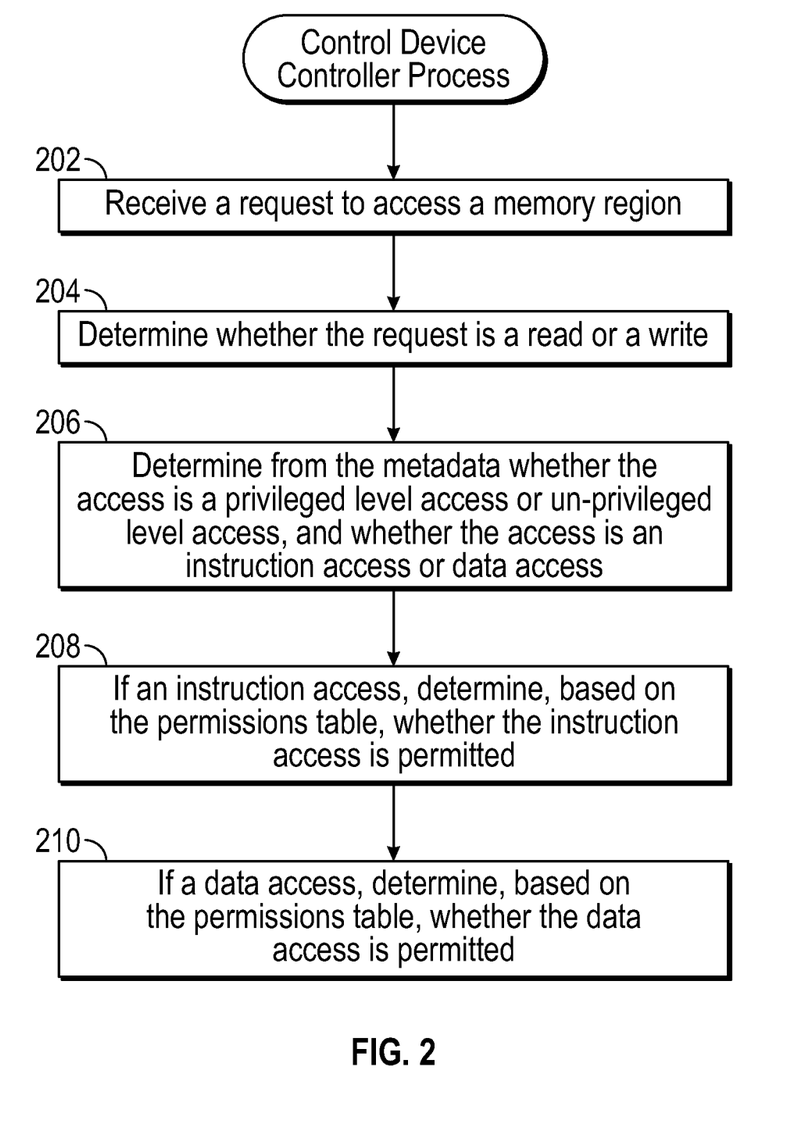
FIG. 2 is a flow diagram of a process of a control device controller according to some examples.

FIG. 2 is a flow diagram of an example process that can be performed by the control device controller 116. The control device controller 116 receives (at 202), from a requester device, a request to access a memory region in the system memory 110. The request can be a read request or a write request, and can include metadata that specifies different types of access. For example, the metadata can be according to any of various interconnect protocols, such as the Advanced eXensible Interface (AXI) protocol from ARM Holdings, the Open Coherent Accelerator Processor Interface (OpenCAPI) protocol from the Open CAPI Consortium, and so forth.

In some examples, the metadata can include a first indicator (e.g., a bit) that if set to a first value indicates privileged access and if set to a second value different from the first value specifies un-privileged access. The metadata can further include a second indicator (e.g., a bit) that if set to a first value indicates an instruction access but if set to a different second value indicates data access.

When the control device controller 116 receives the request, the control device controller 116 can determine (at 204) from the request whether the request is a read request or a write request. In addition, the control device controller 116 determines (at 206) from the metadata in the request whether the access is a privileged level access or un-privileged level access, and whether the access is an instruction access or data access.

If the requested access is an instruction access, the control device controller 116 determines (at 208), based on the permissions table 118, whether the instruction access is permitted. In some examples, if the instruction access is of protected content in a respective memory region of the memory regions 110-1 to 110-n containing program code (e.g., a kernel code or a driver code), the control device controller 116 can access the respective entry of the permissions table 118 to determine whether or not the requested instruction access is permitted, such as based on the privileged access mode indicated by the respective entry of the permissions table 118. For example, if the permissions information in the respective entry of the permissions table 118 indicates a privileged access mode to execute the program code, then the control device controller 116 permits fetching of the program code from the respective memory region for execution if the metadata in the request indicates a privileged level access (i.e., the requester is operating at the privileged level). However, the control device controller 116 denies access of the program code from the respective memory region if the metadata in the request indicates an un-privileged level access (i.e., the requester is operating at an un-privileged level).

The determination at 208 further addresses another scenario in which the instruction access is of a memory region that is outside of the memory regions 110-1 to 110-n being protected.

In some examples, if the instruction access is of a memory region that is outside of the memory regions 110-1 to 110-n being protected by the permissions table 118, the control device controller 116 can simply forward the request to the memory controller 112 for handling.

In alternative examples, if the instruction access is of a memory region that is outside of the memory regions 110-1 to 110-n being protected by the permissions table 118, the control device controller 116 can prevent fetching of a privileged program code from the memory region that is outside of the memory regions 110-1 to 110-n for execution. In the latter examples, execution of privileged program code is allowed from a memory region (from the memory regions 110-1 to 110-n) designated to store privileged program code by the permissions table 118. However, execution of privileged program code from a memory region not designated to store privileged program code by the permissions table 118 is prohibited by the control device controller 116. This can protect against malware or another attacker running the privileged program code to perform an unauthorized operation in the computer system 100. More generally, in some examples, a request to fetch a program code in a memory region of the memory for execution is denied in response to determining that the permissions information does not identify a privileged access level for the memory region.

If the requested access is a data access (not a request to access privileged program code but a request to access the kernel configuration, Syscall table, kernel RO data, and/or kernel data of Table 1, for example), the control device controller 116 determines (at 210), based on the permissions table 118, whether or not the requested data access is permitted. The determination at 210 can be based on the type of requested data access (e.g., read or write access, privileged access) and a comparison of the requested type of data access to the permissions information in a respective entry of the permissions table 118. For example, if the permissions information in the respective entry of the permissions table 118 specifies that a write request is not permitted, then the control device controller 116 can deny access if the request specifies a write.

Figure 3:
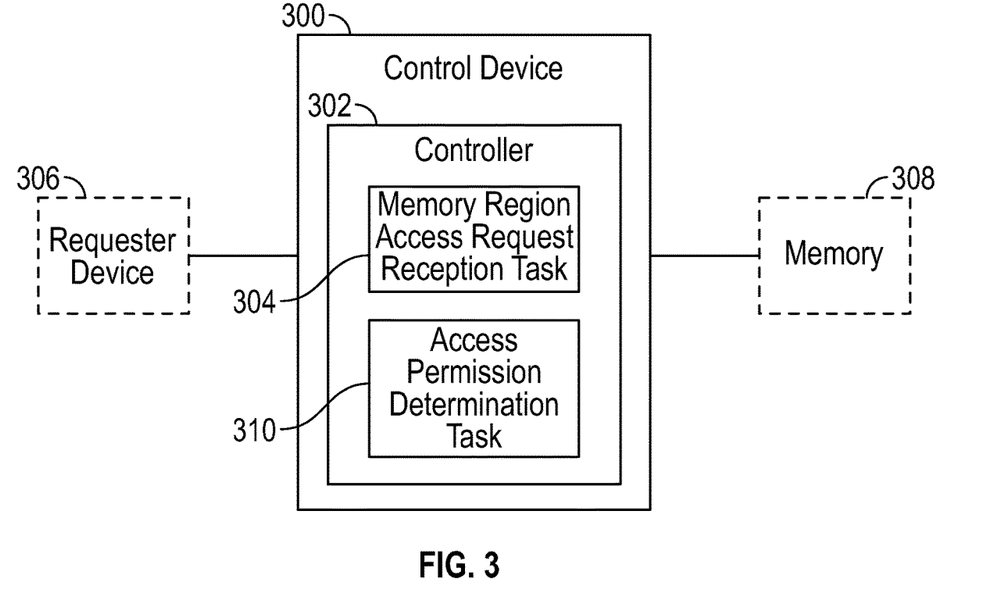
FIG. 3 is a block diagram of a control device according to some examples.

FIG. 3 is a block diagram of a control device 300, such as the protective control device 114. The control device 300 includes a controller 302 to perform various tasks, such as by the hardware processing circuit of the controller 302 or by machine-readable instructions executable on the controller 302.

The tasks include a memory region access request reception task 304 to receive, from a requester device 306 that is separate from the control device 300, a request to access a first memory region of a memory 308 (e.g., the system memory 110 of FIG. 1).

The tasks further include an access permission determination task 310 to determine, based on occurrence of a systems initialization event and according to permissions information (e.g., in the permissions table 118) that identifies access permissions for respective memory regions of the memory 308, whether access of content in the first memory region is allowed.

The memory regions of the memory 308 for which the permissions information identifies the access permissions contain data and program code, and wherein the request is a request to access the data or the program code.

In some examples, a lock indicator when set to a specified value prevents modification of the permissions information. The lock indicator is to be reset responsive to a restart of a system in which the control device 300 is to be provided.

In some examples, an access permission identified by the permissions information for the first memory region indicates that the first memory region contains program code. The controller 302 allows execution of the program code in the first memory region responsive to the request.

In some examples, the controller 302 is to deny permission to execute a program code from a second memory region in the memory 308, the second memory region different from the first memory region.

In some examples, the access permission identified by the permissions information for the first memory region indicates instruction access of the first memory region and that access to the first memory region is at a privileged level.

Figure 4:
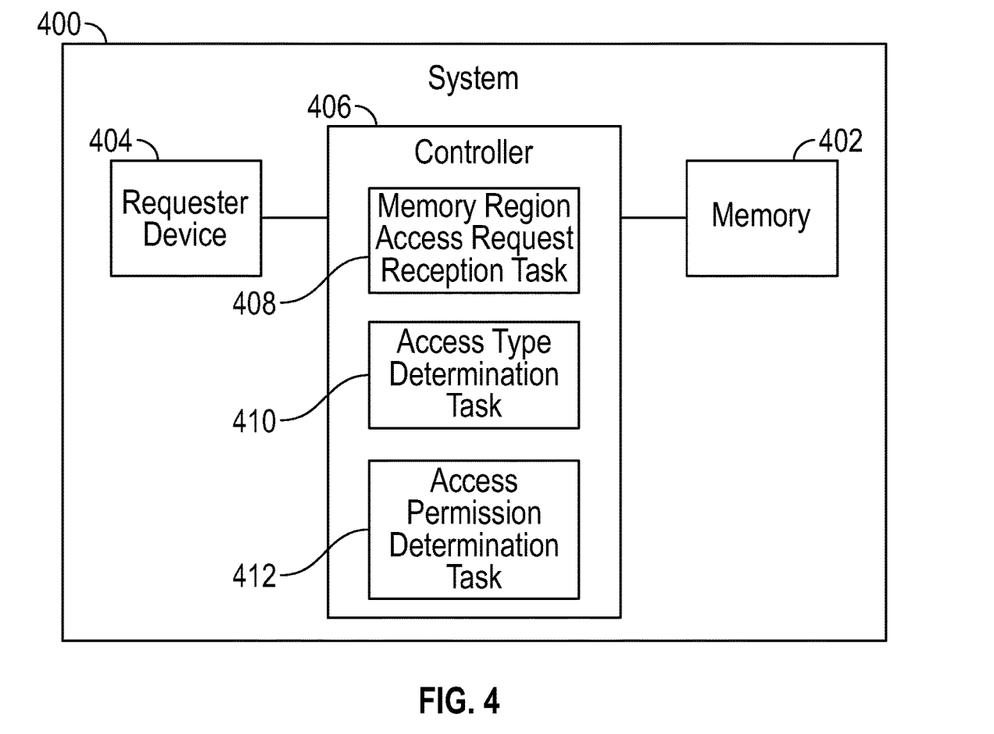
FIG. 4 is a block diagram of a system according to some examples.

FIG. 4 is a block diagram of a system 400 according to some examples. The system 400 includes a memory 402 and a requester device 404 (e.g., the processor 102 of FIG. 1) that is able to access the memory 402.

The system 400 further includes a controller 406 (e.g., the control device controller 116 of FIG. 1) separate from the requester device 404. The controller 406 is able to perform various tasks.

The tasks include a memory region access reception task 408 to receive, from the requester device 404, a request to access a first memory region of the memory 402.

The tasks further include an access type determination task 410 to determine a type of the access of the request based on the request and metadata in the request.

The tasks further include an access permission determination task 412 to determine, based on occurrence of a systems initialization event and according to permissions information that identifies access permissions for respective memory regions of the memory 402 that contain different protected information, whether the type of access of request of content in the first memory region is allowed.

In some examples, the permissions information is to be populated by the kernel or firmware responsive to writing of the protected information to the respective memory regions of the memory 402.

In some examples, the system 400 includes a register containing a lock indicator that when set to a specified value prevents modification of at least a portion of the permissions information, and where a program code (e.g., the firmware 106 and the kernel 105 of FIG. 1) is to, after the lock indicator has been set to the specified state, permit modification of at least the portion of the permissions information responsive to receiving a credential.

In some examples, the system 400 includes a configuration register including a mode indicator that if set to a first value indicates that the permissions information is to be written to a data structure according to a first mode in which the permissions information cannot be modified after being initialized in the data structure, and to a second value indicates that the permissions information is modifiable responsive to receipt of a credential.

Figure 5:
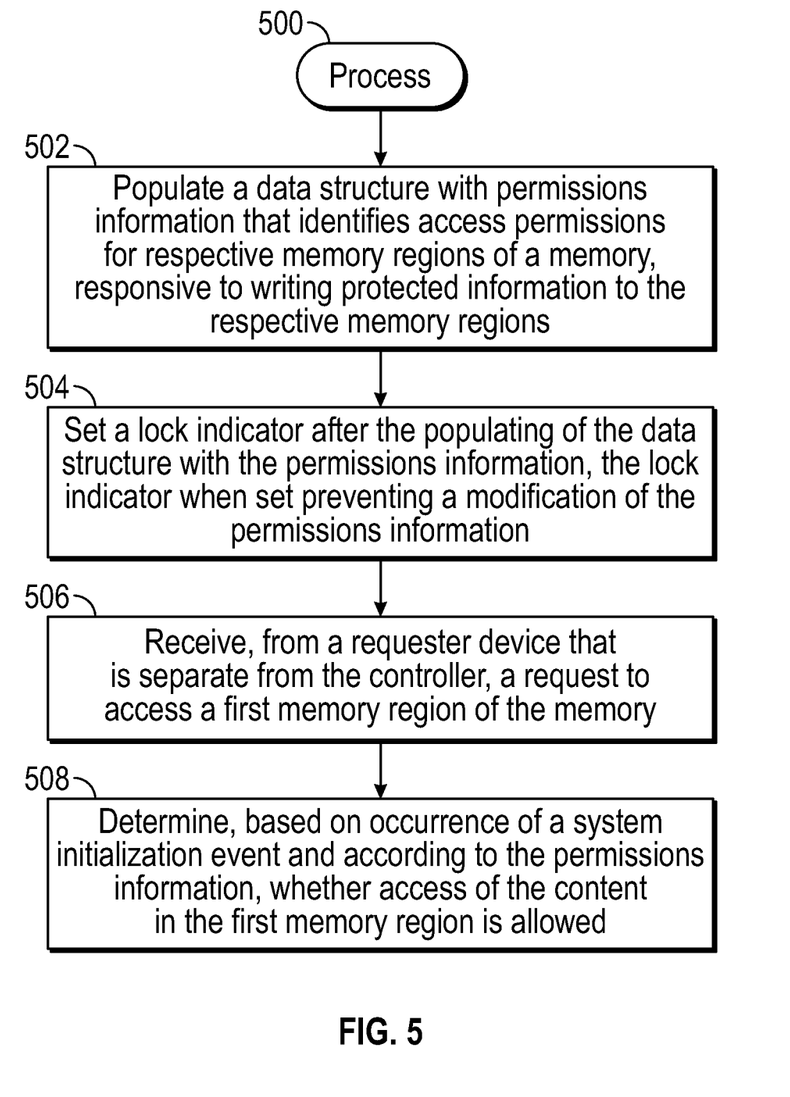
FIG. 5 is a flow diagram of a process according to some examples.

FIG. 5 is a flow diagram of a process 500 performed by a controller (e.g., the control device controller 116 of FIG. 1 or the controller 302 of FIG. 3) according to some examples.

The process 500 includes populating (at 502) a data structure with permissions information that identifies access permissions for respective memory regions of a memory, responsive to writing protected information to the respective memory regions.

The process 500 includes setting (at 504) a lock indicator after the populating of the data structure with the permissions information, the lock indicator when set preventing a modification of the permissions information.

The process 500 includes receiving (at 506), from a requester device that is separate from the controller, a request to access a first memory region of the memory.

The process 500 includes determining (at 508), based on occurrence of a systems initialization event and according to the permissions information, whether access of content in the first memory region is allowed.

In some examples, tasks discussed herein can be performed by machine-readable instructions stored in a non-transitory machine-readable or computer-readable storage medium, where the machine-readable instructions upon execution cause a system to perform the tasks. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A control device comprising:
a controller to:
receive, from a requester device that is separate from the control device, a request to access a first memory region of a memory;
in response to the request, access permissions information comprising a plurality of entries corresponding to respective different memory regions of the memory, wherein each entry of the plurality of entries comprises a plurality of indicators including a first indicator settable to an active value indicating an execution access mode in which instructions are fetched from a memory region for execution, a second indicator settable to an active value indicating a privileged access mode in which access of a memory region is allowed by a requester at a privileged level, and a third indicator indicating a read mode or a write mode of a memory region; and
determine, based on occurrence of a system initialization event and according to metadata of the request and the permissions information, whether access of content in the first memory region is allowed.

2. The control device of claim 1, wherein the different memory regions corresponding to the plurality of entries of the permissions information comprise the first memory region that contains program code, and a second memory region that contains data.

3. The control device of claim 1, wherein the third indicator is a read access mode indicator that when set to an active value indicates that read access of a memory region is allowed, and wherein the plurality of indicators further comprise a fourth indicator that is a write access mode indicator that when set to an active value indicates that write access of a memory region is allowed.

4. The control device of claim 1, further comprising a lock indicator that when set to a specified value prevents modification of at least a portion of the permissions information.

5. The control device of claim 4, wherein the lock indicator is to be reset responsive to a restart of a system in which the control device is to be provided.

6. The control device of claim 1, wherein a first entry of the permissions information for the first memory region indicates that the first memory region contains program code, wherein in the first entry the first indicator is set to the active value of the first indicator.

7. The control device of claim 6, wherein the controller is to permit execution of the program code in the first memory region responsive to the metadata of the request indicating an instruction access.

8. The control device of claim 7, wherein the controller is to deny permission to execute the program code in the first memory region responsive to the metadata of the request indicating a data access.

9. The control device of claim 7, wherein in the first entry of the permissions information for the first memory region the second indicator is set to the active value of the second indicator indicating the privileged access mode, and wherein the controller is to permit execution of the program code in the first memory region further responsive to the metadata of the request indicating a privileged access.

10. The control device of claim 7, wherein in the first entry of the permissions information the plurality of indicators are set to prevent read access and write access of the first memory region containing the program code.

11. The control device of claim 1, wherein the controller is to:
determine a type of access of the first memory region based on the metadata of the request; and
determine whether access of the content in the first memory region is allowed further based on the determined type of access.

12. The control device of claim 1, wherein the first indicator when set to an inactive value indicates that information in a memory region does not contain instructions for execution, and the second indicator when set to an inactive value indicates a non-privileged access mode in which access of a memory region is allowed by a requester that is not at a privileged level.

13. The control device of claim 1, wherein different entries of the plurality of entries of the permissions information have different combinations of values of the plurality of indicators for respective different types of content in the respective different memory regions.

14. The control device of claim 13, wherein the permissions information comprises a permissions table, and the plurality of entries comprise rows of the permissions table, and the plurality of indicators are columns of the permissions table.

15. A system comprising:
a requester device; and
a controller separate from the requester device and to:
receive, from the requester device, a request to access a first memory region of a memory,
determine a type of the access of the request based on the request and metadata in the request,
in response to the request, access permissions information comprising a plurality of entries corresponding to respective different memory regions of the memory that contain protected information, wherein each entry of the plurality of entries comprises a plurality of indicators including a first indicator settable to an active value indicating an execution access mode in which instructions are fetched from a memory region for execution, a second indicator settable to an active value indicating a privileged access mode in which access of a memory region is allowed by a requester at a privileged level, and a third indicator indicating a read mode or a write mode of a memory region, and
determine, based on occurrence of a system initialization event and according to the metadata in the request and the permissions information, whether the type of the access of content in the first memory region is allowed.

16. The system of claim 15, further comprising an operating system kernel or firmware to populate the permissions information responsive to writing of the protected information to the respective different memory regions of the memory.

17. The system of claim 15, further comprising a register containing a lock indicator that when set to a specified value prevents modification of at least a portion of the permissions information, and wherein a program code is to, after the lock indicator has been set to the specified value, permit modification of the permissions information responsive to receiving a credential.

18. The system of claim 15, further comprising a configuration register including a mode indicator that if set to a first value indicates that the permissions information is to be written to a data structure according to a first mode in which the permissions information cannot be modified after being initialized in the data structure, and if set to a second value indicates that the permissions information is modifiable responsive to receipt of a credential.

19. A method performed by a controller in a system, comprising:
   responsive to writing protected information to respective memory regions of a memory, populating a data structure with permissions information that identifies access permissions for the respective memory regions, wherein the permissions information comprises a plurality of entries corresponding to the respective memory regions of the memory, wherein each entry of the plurality of entries comprises a plurality of indicators including a first indicator settable to an active value indicating an execution access mode in which instructions are fetched from a memory region for execution, a second indicator settable to an active value indicating a privileged access mode in which access of a memory region is allowed by a requester at a privileged level, and a third indicator indicating a read mode or a write mode of a memory region;
   setting a lock indicator after the populating of the data structure with the permissions information, the lock indicator when set preventing a modification of the permissions information;
   receiving, from a requester device that is separate from the controller, a request to access a first memory region of the memory; and
   determining, based on occurrence of a system initialization event and according to metadata of the request and the permissions information, whether access of content in the first memory region is allowed.

20. The method of claim 19, wherein each entry of the plurality of entries of the permissions information comprises memory address information defining a memory region of the memory regions of the memory.

* * * * *